Figure 1:
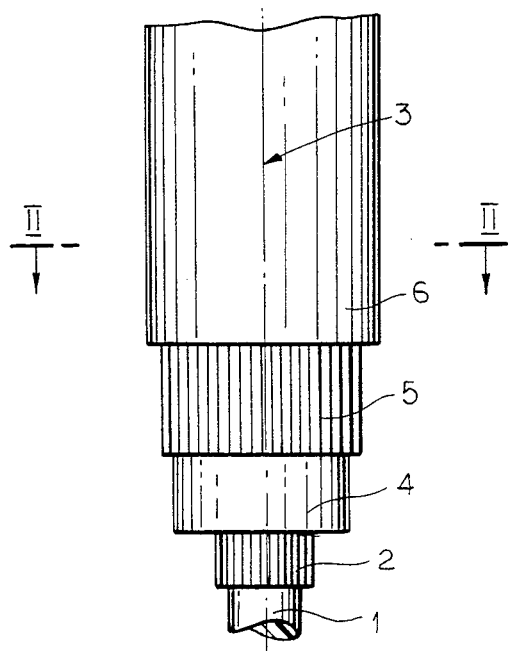

United States Patent [19]

Invernizzi

[11] Patent Number: 4,816,611
[45] Date of Patent: Mar. 28, 1989

[54] CARRIER SYSTEM FOR LIGHTNING CURRENT

[75] Inventor: Cesare G. Invernizzi, Geneva, Switzerland

[73] Assignee: E. F. International S.A., Geneva, Switzerland

[21] Appl. No.: 105,545

[22] Filed: Oct. 5, 1987

[30] Foreign Application Priority Data

Nov. 1, 1986 [CH] Switzerland .................... 4379/86

[51] Int. Cl.⁴ .................... H02G 13/00; H01B 7/00
[52] U.S. Cl. .................... 174/2; 174/6; 174/102 R; 174/131 A
[58] Field of Search .................... 174/2, 3, 4 R, 189, 174/102 R, 102 SP, 105 R, 105 B, 107, 131 A

[56] References Cited

U.S. PATENT DOCUMENTS

| | | | |
|---|---|---|---|
| 3,790,697 | 2/1974 | Buckingham | 174/109 X |
| 3,919,956 | 11/1975 | Invernizzi | 174/6 X |
| 4,480,146 | 10/1984 | Invernizzi | 174/3 |

FOREIGN PATENT DOCUMENTS 2013998  8/1979  United Kingdom .................... 174/2

Primary Examiner—Laramie E. Askin
Attorney, Agent, or Firm—Ladas & Parry

[57] ABSTRACT

Around an insulating central core (1) is arranged a first conductive component planned to put to earth a lightning installation. This first conductive component is composed of metallic wires (2) spreading parallel to the axis (3) of the whole. An annular coating made of insulating material (4) is arranged around the metallic wires (2) and a second conductive component, constituted by metallic wires (5), is arranged around this intermediate insulating coating (4). Metallic wires of this second component also spread parallel to the axis (3) of the whole and they are joined so as to form a metallic shielding. An outside protecting coating (6), made of insulating material, wraps the set of wires (5) of the second conductive component. This arrangement of metallic wires (2, 5) reduces at least their ohmic resistance and their inductance, which improves the performances of the whole for suppressing of side-flashings. A high voltage terminal properly sized contains the upper part so that, when lightning strikes it, it will be injected in an electrically hermetic system.

2 Claims, 1 Drawing Sheet

CARRIER SYSTEM FOR LIGHTNING CURRENT

It is known that lightning protection installations present serious risks because, when they are hit by lightning, discharges named high-energy side-flashings burst between bare copper conductors standardized as conductors to be earthed, and objects, or persons, being in their vicinity.

Because of the ever-growing height of structures to be protected, lightning current cannot remain confined within bare down conductors without breakdowns occurring with often disastrous outcomes:

fires;

striking of persons;

destruction of electrical and electronic material;

etc.

The Author of the present invention had already proposed a system of conveying lightning to the earthing device palliating this major disadvantage (U.S. Pat. No. 3,919,956 and corresponding patents in other countries), consisting of placing around the down conductor a metallic sheath held at a distance of this conductor by a coating of insulating material, this metallic sheath being contained too in an insulating coating, the whole being earthed.

It is by means of concepts pertaining to high voltage techniques that the improvements described in the present invention could be made—with regard to conventional down conductors—with regard to all previous lightning protection installations that cannot be integrated within an electrically hermetic set which is made possible only if there is a coaxial structure providing hermeticity—and, finally, with regard to the above-identified patent and corresponding foreign patents.

Side-flashings occur along bare or ordinarily insulated down conductors when the voltage gradient becomes higher than the withstanding value. The value of the electric field on the surface of a bare cylindric conductor depends upon its diameter as well as the environment. The voltage that appears on this conductor while lightning flows depends upon the longitudinal ohmic resistance in alternating current of the latter.

This resistance can be calculated in resolving Maxwell's equations for a cylindric conductor using Bessel's functions. A representative view of the phenomenon is given by the notion of penetrating depth. In this manner, it is possible to put into light the "actually used part of the conductor". The spectrum of frequencies constituting a lightning current ranges from 20 to 100 kHz. For a copper cylindric conductor, respectively 0.48 and 0.21 mm are obtained as penetrating depth. Therefore, a hollow cylindric conductor shows advantages over a solid conductor with similar section.

EXAMPLE 6 mm $\phi$ bare copper wire, $\phi$ representing diameter, and $R_{ac}$ representing alternating current resistance.

$R_{ac}=2.1$ mΩ/m (20 kHz)

$R_{ac}=4.6$ mΩ/m (100 kHz)

EF special cable $R_{ac}=0.9$ mΩ/m (20 kHz)

$R_{ac}=2.2$ mΩ/m (100 kHz)

Improvement factor about 2.

The above values have been calculated with classical formulas taken from the three following references:

(1) Hochspannungsfelder, H. Prinz Verlag (Publisher), Oldenburg (2) "Hochspannungstechnik Vorlesung", Prof. Dr. K. Berger (lectures given by Dr. Berger in the Zurich Polytechnikum)

(3) Wirbelstrome and schirmung in der Nachrichtentechnik, Dr. phil. H. Kaden, Springer Verlag (Publisher).

For the structure object of this present invention, these values have been checked by means of laboratory measurements. The results were as follows:

(i) When the insulating intermediate layer is properly sized, side-flashing never occurs and no damage on the structure can be noticed—even if surges are produced in the central conductor;

(ii) What can be noticed during surges are very low-energy glow discharges which may occur around the structure without damaging it. Those discharges had already been noticed by Tesla, one century ago, during his experiments on high frequency currents.

As the value of surges contained in a lightning conductor depends upon the crest value and discharges waveform—the author could benefit by very comprehensive data on lightning current impulses recently submitted by Anderson (Anderson, "Lightning Research In South Africa,"1980) and Eriksson (Eriksson, "Lightning Induced Overvoltage On Overhead Distribution Lines", 1982 and Eriksson, "An Improved Electrogeometric Model For Transmission Line Shielding Analysis, 1987) in order to study the behaviour of the present earthing and define its characteristics. The present invention makes possible an earthing able to stand all lightning currents.

The thorough study of all those parameters showed that the impedance, i.e. the ohmic resistance and the lightning conductor and metallic sheath inductance, has an adverse effect, whence the advantage to reduce it at most. Yet, the sheathed cables make use of a central conductive component constituted of a set of metallic wires rolled like a helix around a central core made of insulating material and the metallic shielding is likewise achieved in using wires or metallic stripes rolled like a helix or the insulating coating wrapping the internal conductive component.

The result is that, even if windings constituting the internal conductive component and the sheath are jointed, or even overlapping (if they are metallic strips and not wires), the unavoidable layer of oxide on these wires or strips acts so that the current follows a helicoidal path and not a linear one, whence increased ohmic resistance and inductance.

In using wires or metallic strips parallel to the cable central line, the impedance is very appreciably reduced and the performances of a lightning conductor are improved in the sense of the present invention.

The annexed drawing represents an example of accomplishment of this lightning conductor. FIG. 1 is a top plan view of the carrier system showing the various layers.

Figure 2:
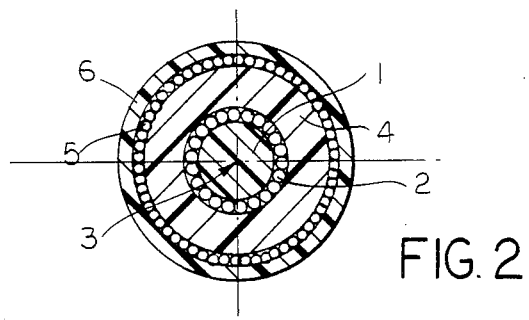

FIG. 2 is a cross-section view according to 2—2 of FIG. 1.

This lightning conductor is a structure of which is shown at 1 in the circular section core made of an insulating material around which are jointly put metallic wires 2 spreading in a parallel direction to the central line 3, which is the axis of this whole if it is rectilinear. These wires 2 constitute a first earthing component of a lightning installation starting from the point (not shown) of the installation to the earthing device (not shown). Because of the pellicular effect pertaining to high voltage current, it is unnecessary that the space where the insulating core 1 is be filled by conductive wires 2.

At 4 is seen an insulating coating wrapping the layer of wires 2, the thickness and the quality of which are sufficient so as to stand surges which occur in component 2 when the lightning current runs through it. At 5, a second set of joined metallic wires is put spreading in a parallel direction to the central axis 3. All these wires 5 constitute a second conductive component, which completely wraps the insulating sheath 4 and, therefore, also the first conductive component 2. All these wires 5 constitute an electrical shielding for wires 2 and are earthed at their lower ends (not shown).

Around the layer of conductive wires 5 is arranged a protecting sheath 6 made of insulating material properly sized. The wires 5 could be overlapping parallel metallic strips, so that their set constitutes a true conductive pipe.

One could imagine that the second conductive component (5) is really tubular—but this would have the serious defect to make difficult the rolling of this structure without damaging it and to put it on a coil for storing and transportation of cables. The provision of a corrugated pipe would make easier this rolling but the ohmic resistance would be increased and, above all, the inductance, since in that case the current in this component would follow a corrugated path.

The insulation electrical solicitation must be defined on the whole length of the structure, independently of outside conditions—whence the requirements, like in high voltage cables, to use a concentric conductive screen. So, it will be possible to put this lightning conductor near metallic points or edges without any negative effect on its electrical withstanding value.

The high voltage insulation must be mechanically protected, so to avoid any damaging risk during the transportation, the mounting and the implementation. The strong metallic whole and a sheath standing extreme climatic conditions perfectly fills this role.

Finally, thanks to the protective screen, it is possible to check, at any time, the state of the high voltage insulation by means of two simple electrical tests.

All these considerations made possible to achieve a lightning protection downconductor answering the requirements of the Modern World, with a risk of lateral size breakdowns being from 45 to 90% lower than the risk of a bare conductor. Laboratory experiments and calculated values confirm the merits of this concept.

The carrier system is connectable to a high voltage terminal, properly sized so as to contain the upper end of the earthing so that, as soon as lightning strikes it, the discharge is injected in an electrically hermetic system.

I claim:

1. Lightning protection downconductor comprising a first lightning conductive component, an insulating sheath coating it, and a second conductive component entirely coating this insulating sheath, the whole being earthed at its lower end, wherein the first and second components are made of a set of filiform metallic conductors which all spread in a parallel direction to a central line of the set composed by those two conductive components and the intermediate insulating sheath.

2. Lightning protection downconductor according to claim 1, wherein the second conductive component is made of overlapping strips so as to compose together a metallic cylinder.

* * * * *